United States Patent
Knieling et al.

(10) Patent No.: US 8,375,683 B2
(45) Date of Patent: Feb. 19, 2013

(54) APPARATUS FOR CLOSING CONTAINERS WITH CONTACTLESS TORQUE GENERATION

(75) Inventors: Erwin Knieling, Pfatter (DE); Markus Schoenfelder, Regensburg (DE); Andreas Dewert, Obertraubling (DE); Manfred Ziegler, Passau (DE); Guenter Frankenberger, Koefering (DE); Volker Stammel, Regensburg (DE)

(73) Assignee: Krones AG (DE)

(*) Notice: Subject to any disclaimer, the term of this patent is extended or adjusted under 35 U.S.C. 154(b) by 412 days.

(21) Appl. No.: 12/709,139

(22) Filed: Feb. 19, 2010

(65) Prior Publication Data

US 2010/0212259 A1 Aug. 26, 2010

(30) Foreign Application Priority Data

Feb. 20, 2009 (DE) .......................... 10 2009 009 822

(51) Int. Cl.
*B67B 3/20* (2006.01)
(52) U.S. Cl. ..................................... 53/317; 53/331.5
(58) Field of Classification Search ............... 53/343; 141/92; 310/90.5, 103; 464/29
See application file for complete search history.

(56) References Cited

U.S. PATENT DOCUMENTS

| | | | |
|---|---|---|---|
| 5,313,765 A * | 5/1994 | Martin | 53/317 |
| 5,809,742 A * | 9/1998 | Takakusaki et al. | 53/317 |
| 5,848,515 A * | 12/1998 | Catelli et al. | 53/167 |
| 6,041,571 A * | 3/2000 | Fields et al. | 53/331.5 |
| 6,841,909 B2 * | 1/2005 | Six | 310/103 |
| 7,334,380 B2 | 2/2008 | Brunee | |
| 7,341,079 B2 * | 3/2008 | Zanga | 141/92 |
| 2005/0150193 A1 * | 7/2005 | Bernhard | 53/317 |
| 2006/0059862 A1 * | 3/2006 | Zanga | 53/319 |
| 2006/0073766 A1 * | 4/2006 | McGlasson | 451/5 |
| 2009/0255214 A1 * | 10/2009 | Schussler et al. | 53/331.5 |
| 2010/0126116 A1 * | 5/2010 | Buchhauser et al. | 53/287 |
| 2011/0013474 A1 * | 1/2011 | Ludwig et al. | 366/102 |

FOREIGN PATENT DOCUMENTS

| | | |
|---|---|---|
| DE | 4131910 A1 * | 4/1993 |
| DE | 203 01 532 | 4/2003 |
| DE | 10 2006 039 090 | 2/2008 |
| EP | 1 186 873 | 3/2002 |

* cited by examiner

*Primary Examiner* — Stephen F Gerrity
(74) *Attorney, Agent, or Firm* — Hayes Soloway P.C.

(57) ABSTRACT

An apparatus for treating containers includes a housing, inside which a sterile chamber is formed. A treatment element is arranged inside the housing and is rotatable about a predefined axis. The treatment element is arranged on a carrier inside the housing, and has a drive device for driving the treatment element. The drive device is arranged at least partially outside the sterile chamber and includes at least a first drive element arranged outside the sterile chamber for generating rotational movements, and a second drive element arranged inside the sterile chamber. The first drive element and the second drive element cooperate in a contactless manner to generate rotational movement of the treatment element. The drive elements in each case have at least one magnetisable element and preferably at least the second drive element is displaceable in the direction of its axis of rotation relative to the sterile chamber.

18 Claims, 6 Drawing Sheets

APPARATUS FOR CLOSING CONTAINERS WITH CONTACTLESS TORQUE GENERATION

BACKGROUND OF THE INVENTION

The present invention relates to an apparatus for closing containers. Such apparatuses, which are hereinafter also referred to as closing machines, have long been known in the prior art. They serve to close containers, for example plastic containers, with closures. For example, screw closures are screwed onto the containers. In many applications, it is necessary to this end that the containers are guided through a sterile chamber and in this way can be closed in a sterile environment. In addition, however, the present invention is also applicable to other apparatuses for treating containers, such as for example filling installations, sterilisation devices, cleaning units, transport devices and the like.

U.S. Pat. No. 7,334,380 B2 discloses an apparatus for screwing closures onto containers. The apparatus comprises a rotatable spindle which has a closing head at one end and which is connected at the other end to a coupling element, wherein this coupling element comprises a magnetic core and a magnetic bell, which cooperate with one another.

Also provided is a displacement device which can displace the magnetic bell and the magnetic core relative to one another between a position in which they are in engagement with one another and a position in which they are uncoupled from one another. In this way, a coupling or uncoupling is achieved by using a magnetic coupling. EP 0 863 106 A1 likewise describes a closing apparatus. In this case, a closing head is arranged on a rotatable spindle. Provided at the upper end of this spindle is a plurality of permanent magnets which are in each case arranged with alternating poles next to one another. Also provided is a rotation-generating means, on which likewise a plurality of permanent magnets is arranged, wherein a cooperation between these rotating elements also brings about a rotation of the spindle.

EP 1 186 873 discloses a magnetic coupling device for transmitting and measuring torques, which comprises a first and a second body which rotate in relation to an axis.

DE 203 01 532 describes an electric motor drive. This drive comprises a stator extending over a sector of the circumference and a rotor provided with permanent magnets, wherein in each case run-out zones with run-out sides facing towards the rotor are provided at the peripheral ends of the stator, which run-out zones, starting from the curved inner side of the stator parallel to the outer side of the rotor, are at an increasing distance from the outer side of the rotor along their circumferential extent.

DE 10 2006 039 090 A1 discloses a drive for rotary machines. This drive comprises a stationary machine part and a rotatable machine part, wherein a collar having a plurality of magnets is provided around the circumference on one machine part and at least one corresponding stator which covers just a partial sector of the collar is arranged on another machine part.

In the case of such closing apparatuses, it is usually necessary that the closing head is not only rotated but rather also is raised and lowered. For this reason, in the prior art, sealing elements such as shaft sealing rings for example are often provided between the areas located outside the sterile chamber and the areas located inside the sterile chamber. In addition, it is also known to insert a so-called water lock for sealing purposes between the rotatable and stationary parts. Furthermore, it is known that in the case of standard filling machines the starwheels are driven by means of toothed wheels on the starwheel column, wherein these toothed wheels are in turn connected to the main drive.

However, such connections between the sterile chamber and the outside environment usually represent weak points of such closing machines or also of other installations for treating containers.

The object of the present invention is therefore to provide an apparatus for closing containers which at least reduces the need for sealing devices between the sterile chamber and the area located outside the sterile chamber.

SUMMARY OF THE INVENTION

An apparatus according to the invention for treating containers comprises a housing, with a sterile chamber being formed inside this housing. Furthermore, the apparatus comprises a treatment element for treating the containers, which is arranged inside the housing and which is rotatable about a predefined axis. Also provided is a drive device for driving the treatment element, wherein this drive device is arranged at least partially outside the sterile chamber.

According to the invention, the drive device comprises at least a first drive element arranged outside the sterile chamber for generating rotational movements, and the treatment element is coupled to a second drive element for transmitting torques, said second drive element being arranged inside the sterile chamber and being rotatable about a predefined second axis of rotation. In this case, the first drive element and the second drive element cooperate in a contactless manner in order to generate the rotational movement of the closing head and are separated from one another by at least one wall. Furthermore, the drive elements in each case have at least one magnetisable element and preferably at least the second drive element is displaceable inside the sterile chamber in the direction of its axis of rotation relative to the sterile chamber.

All known types of drive can be used to generate the rotational movement for the at least one drive element (e.g. electric drives such as synchronous, asynchronous and servo motors; magnetic drives such as electromagnets or permanent magnets; mechanical drives such as toothed wheels; pneumatic drives, etc.).

A drive device is understood to mean the drive in its entirety, which ultimately drives the closing head to perform rotational movements. The closing head is the element which ultimately applies the closures to the containers, for example screws said closures onto these containers. The required closing torque can be applied by all customary systems (such as e.g. grid coupling, magnetic coupling, servo motor, hysteresis elements, etc.).

According to the invention, this drive device comprises two cooperating drive elements, wherein ultimately the rotational movement of the closing head or of the treatment element is generated by a cooperation between these drive elements. A coupling of the closing head and of the second drive element in order to transmit torques is understood to mean that a rotation of the second drive element at least at times brings about a rotation, in particular a synchronous rotation, of the closing head or treatment element.

The magnetisable element may be on the one hand permanent magnets, but may on the other hand also be electromagnets or also coils for example. In particular, magnetisable elements are understood to mean those elements which are able to generate a magnetic field. In particular, the generation of rotations of the closing head is possible regardless of a position of the second drive element relative to its axis of rotation. Moreover, preferably no uncoupling takes place in certain rotary positions between the two drive elements.

In one preferred embodiment, the first drive element is a coupling device which is rotatable about a third axis of rotation and the second drive element is a second coupling device which cooperates with the first coupling device, wherein the first coupling device and the second coupling device are configured in such a way that torques can be transmitted in a contactless manner from the first coupling device to the second coupling device and/or torques can be generated.

It is provided here that the two coupling devices rotate together, i.e. that a rotation of the first drive element, which is arranged outside the sterile chamber, leads to a synchronous rotation of the second drive element. However, it would also be possible that one of the drive elements is a stator and the second drive element is a rotor which is arranged such as to be able to rotate relative to this stator. For example, the first drive element outside the sterile chamber could be configured as the stator, which in particular comprises a plurality of electromagnets, and the second drive element could be a rotor arranged inside the sterile chamber. In this case, such an electric motor could be constructed either as an external rotor motor or as an internal rotor motor.

Preferably, the apparatus is an apparatus for closing containers with closures and the treatment element is a closing head which is rotatable about its own axis. In addition, however, the closing head may also be rotatable about a central carrier axis. Preferably, the apparatus comprises a plurality of treatment elements or closing heads. These treatment elements are in this case particularly preferably distributed uniformly in a circumferential direction in relation to a predefined axis of rotation.

In a further advantageous embodiment, the first drive element is displaceable relative to the second drive element in relation to at least one of the abovementioned axes of rotation. In this case, therefore, preferably the second drive element is moved, whereas the first drive element is not displaced in the direction of said axes. Moreover, this embodiment would be conceivable both when the drive elements are coupling devices and when the drive elements represent a stator/rotor combination. Preferably, the second axis of rotation of the second drive element and the third axis of rotation of the first drive element coincide. In a further advantageous embodiment, the second drive element comprises a plurality of permanent magnets. It is thus not necessary to provide current-carrying electromagnets inside the sterile chamber.

In a further advantageous embodiment, the first drive element is arranged inside the second drive element in relation to the second axis of rotation. It is thus possible that the second drive element completely surrounds the first drive element in the circumferential direction inside the sterile chamber. In a further advantageous embodiment, the second drive element comprises a rotatable sleeve. In this case, the permanent magnets may for example be incorporated in this sleeve or may be arranged on the rear wall of this sleeve.

In a further advantageous embodiment, the abovementioned wall, i.e. in particular the sleeve or the sleeve-shaped body between the first drive element and the second drive element, at the same time delimits the sterile chamber. This means that a sterile chamber boundary runs between the first drive element and the second drive element.

In a further advantageous embodiment, at least one magnetisable element of one of the two drive elements is longer than at least one magnetisable element of the other drive element in the direction of the second axis of rotation. In this way, it is possible for the two drive elements to be moved relative to one another in the direction of their axes of rotation, without the rotational coupling between the two drive elements being released in the process.

In a further advantageous embodiment, the magnetic elements of the first drive element are longer than the magnetic elements of the second drive element in the direction of the second axis of rotation. This embodiment allows a particularly easy displacement of the second drive element or of the second coupling device over the first drive element. However, it would also be conceivable in this embodiment that the two drive elements are configured as a stator and rotor.

In a further advantageous embodiment, the second drive element is displaceable relative to the first drive element by a predefined distance and the magnetisable elements of at least one coupling device or of at least one drive element are at least as long as this distance. In this way, a displacement of the drive elements relative to one another by the distance S is permitted, without the magnetic coupling between the drive elements being released as a result.

Preferably, at least some of the magnetic elements are permanent magnets. However, it would also be possible for all the magnetic elements to be configured as permanent magnets, particularly if the drive devices are coupling devices. In addition, however, it would also be possible for electromagnets to be used at least in part as the magnetic elements. The advantage of this embodiment would lie in the fact that the magnetic force of these electromagnets could be controlled and thus so too could the magnetic force to be transmitted and thus also the torque that can be applied to the closing head.

For example, a control device could be provided which actuates such electromagnets in a targeted manner in order to achieve a targeted rotation profile for closing the containers. Furthermore, it would also be possible that the spacing between the magnets of the two drive elements is variable or even is variable in a controlled manner. Also, by changing the spacing, ultimately the torques acting on the container closure can be varied.

In a further advantageous embodiment, arranged inside the sterile chamber is a lifting cam which brings about a movement of the closing head in the direction of its axis of rotation. However, it would also be possible that such a lifting cam is arranged outside the sterile chamber and for example moves the two drive elements synchronously in the direction of said axis of rotation.

In a further advantageous embodiment, the carrier as a whole is rotatable about a carrier axis and the carrier is coupled to the second drive element. In this embodiment, the entire carrier, on which a plurality of treatment elements may also be arranged, is rotated about a central carrier axis. However, the treatment element is thus also rotated about said carrier axis.

The treatment device may be not just the abovementioned closing head but rather also other treatment units such as, for example, filling devices or also transport devices, gripping clamps and the like. A treatment device is thus also understood to mean any device which treats or acts on containers. In this embodiment, the apparatus may for example also be a transport device, such as a starwheel, in which a rotatable carrier is driven in a contactless manner by a magnetic coupling or a motor. In addition, however, the apparatus in this embodiment may also be a filling device.

All of the embodiments described above are nevertheless based on the common concept that in each case a separation between the sterile chamber and the surrounding environment can be achieved without a high complexity in terms of process technology. In each case, a contactless force transmission in the sterile chamber is provided. By contrast, in the prior art, as mentioned above, the necessary components are located in the clean chamber and must therefore also be cleaned, and for this reason in the prior art the electronic components must be designed in a corresponding protection class, which in turn leads to high component costs.

BRIEF DESCRIPTION OF THE DRAWINGS

Further advantages and embodiments will emerge from the appended drawings:
In the drawings.

DETAILED DESCRIPTION OF THE INVENTION

Figure 1:
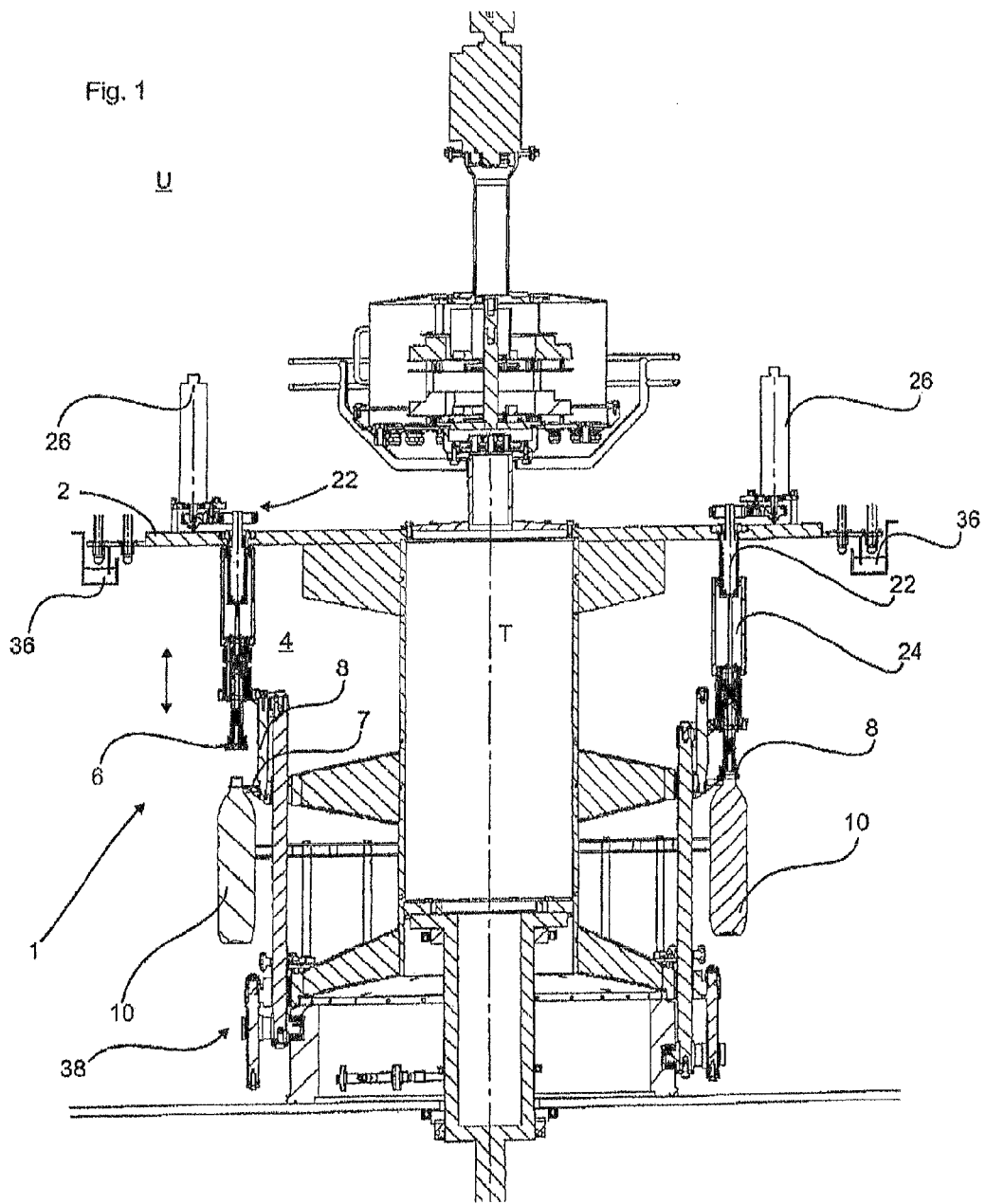
FIG. 1 shows a schematic overall view of an apparatus according to the invention in a first embodiment.

FIG. 1 shows an apparatus 1 according to the invention in a first embodiment. The apparatus shown in FIG. 1 is a closing machine, which closes containers 10 inside a clean chamber 4 with closures. To this end, the apparatus has a closing head 6 which screws closures (not shown) onto the containers 10. Here, this closing head 6 is arranged on the one hand such that it can rotate and on the other hand can be raised and lowered in the direction of the arrow P1 via a carrier 8. In order to achieve this ability to be raised and lowered, a cam 38 is provided inside the sterile chamber 4. The closing head 6 is rotatable about a first axis of rotation X.

The sterile chamber or clean chamber 4 is delimited with respect to the surrounding environment U by a housing 2, which is shown only in part. Provided outside the housing 2 or sterile chamber 4 is a motor, in particular an electric motor, which generates the rotational movement of the closing head 6. Reference 36 denotes a water lock, known per se in the prior art, for sealing the sterile chamber 4. More specifically, the electric motor 26 and also the closing head are rotatable about a central carrier axis T and, as shown in FIG. 1, a plurality of such closing heads are arranged inside the clean chamber 4. The containers 10 are conveyed here on a circular path around the axis T, each of said containers being held by gripping devices 7. It is pointed out that the gripping devices 7 may also be treatment elements for treating the containers.

Figure 2:
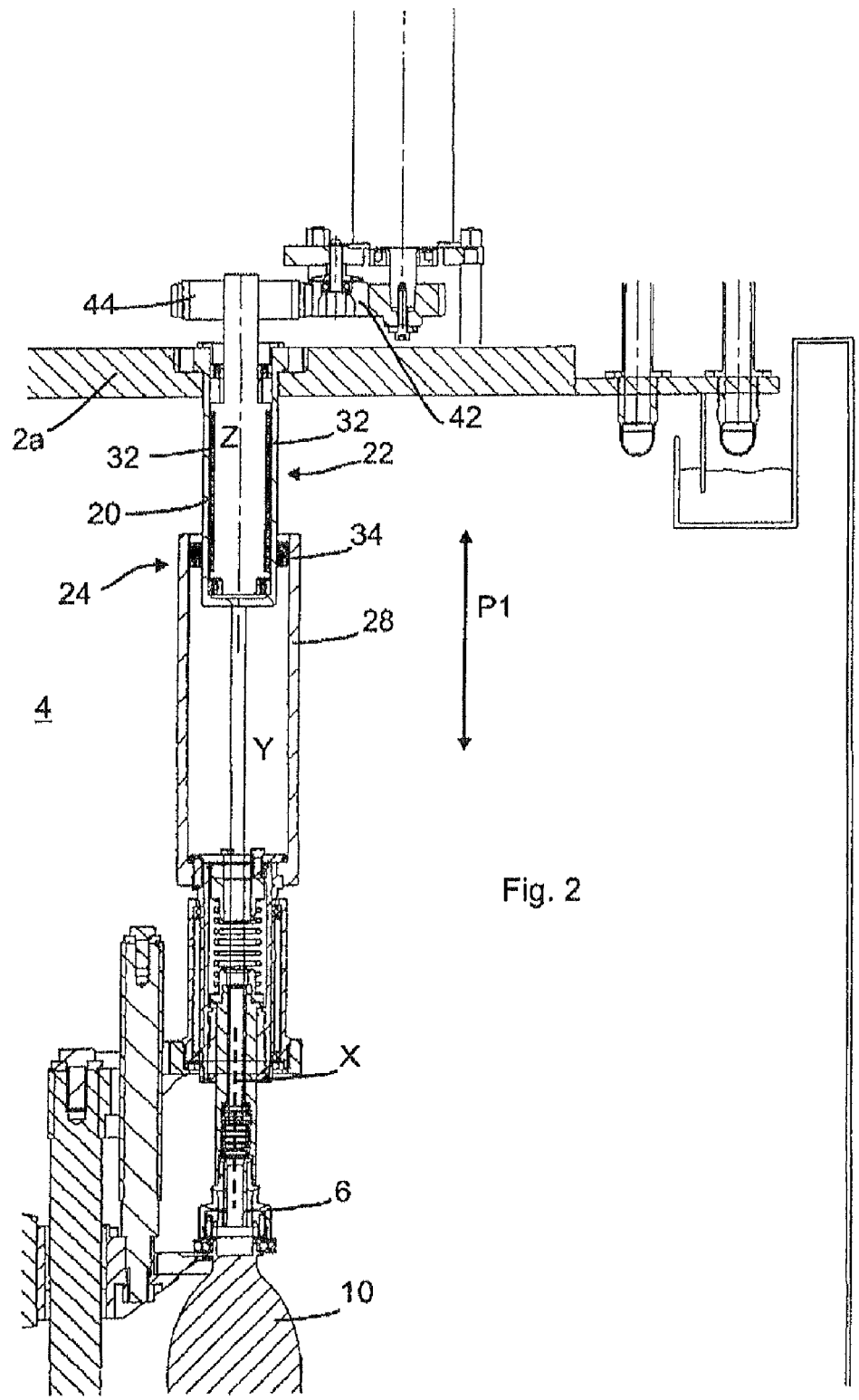
FIG. 2 shows a detail view of the apparatus of FIG. 1.

FIG. 2 shows a detail view of the apparatus shown in FIG. 1, more specifically of the right-hand side of the apparatus shown in FIG. 1. It is possible to see here that a driven toothed wheel 44 is provided outside the clean chamber 4 and is driven by a driving toothed wheel 42 which is arranged on the motor 26. In this way, a first drive element 22 is also driven, said first drive element being arranged geometrically inside the housing 2 but, as will be shown in more detail below, outside the sterile chamber 4. More specifically, this first drive element 22 is arranged between the housing wall 2a and the closing head 6.

This first drive element 22 comprises a plurality of permanent magnets 32 which are rotatable about a third axis of rotation Z and are also arranged such as to be able to rotate relative to a first sleeve-shaped body 20. This sleeve-shaped body 20 furthermore also has a wall or forms the wall which separates the first drive element from a second drive element 24. More specifically, the sleeve-shaped body is closed on one side (in the direction of the sterile chamber 4).

This second drive element 24 likewise comprises a plurality of permanent magnets 34, which are arranged in the circumferential direction. Preferably both the permanent magnets 32 and the permanent magnets 34 are in each case arranged with alternating polarities in the circumferential direction in FIG. 2. The second permanent magnets 34 are arranged on a sleeve 28. A rotation of this sleeve 28 is thus coupled to a rotation of the first drive element 22 via the magnetic forces between the magnets 32 and 34. The closing head 6 in turn is coupled in terms of its rotation to the second drive element 24. The sleeve 28 or the second drive element 24 is rotatable about a second axis of rotation Y. In the present embodiment, the three axes of rotation X, Y and Z geometrically coincide with one another. However, it would also be possible that the axes of rotation do not coincide with one another and are for example parallel to one another.

It can also be seen that the first magnetic elements 32 are longer than the second magnetic elements 34 in the direction of the arrow P and also in the direction of the axes of rotation Z and Y. In this way, the second drive element 24 can be displaced relative to the first drive element 22 in the direction of the arrow P1, with a torque coupling always being maintained between the first drive element 22 and the second drive element 24. In the diagram shown in FIG. 2, the second drive element is in a lowermost position, i.e. in particular the position in which the closure can be screwed onto the container 10.

Figure 3:
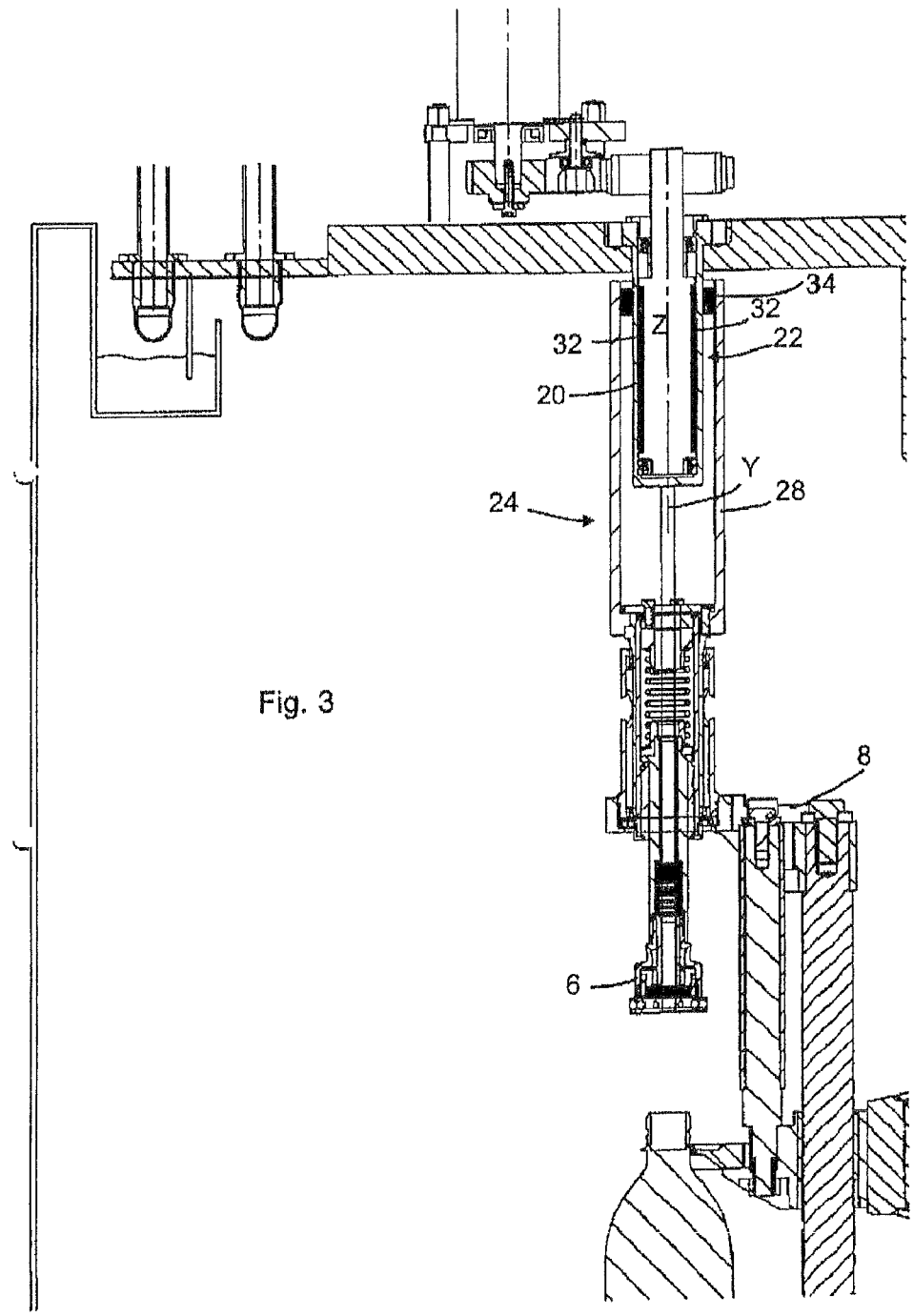
FIG. 3 shows a detail view of the apparatus of FIG. 1.

FIG. 3 shows a further detail of the apparatus shown in FIG. 1. In this state, the closing head 6 and thus also the second drive element 24 is in a highest possible state and it can be seen that here, too, a torque coupling is possible between the magnets 32 and 34. The sleeve 28 is also mounted such as to be able to rotate in relation to the axis Z. In this way, a purely mechanical contactless separation of the drive components is achieved due to force transmission by means of magnets. The sleeve-shaped body 20, which is closed at the bottom here, protrudes into the clean chamber. The drive pinion and the shaft are rotatably mounted in this sleeve-shaped body 20. In this case, therefore, the first drive element 22 also protrudes at least partially geometrically into the sterile chamber 4, but is arranged entirely outside the sterile chamber 4.

In the sterile chamber 4, the sleeve-shaped body 28 with the magnet ring 34 is rotatably mounted on a lifting device or the carrier 8. This is pushed over the above-mentioned sleeve-shaped body 20. As mentioned above, the lifting movements are transmitted by a lifting cam via the lifting element so that a rotation and thus also a torque transmission takes place through the described magnetic coupling. However, it would also be possible to generate the lifting movement in the unsterile area, i.e. outside the sterile chamber in the region U, and to transmit these movements into the sterile chamber 4 likewise by means of a magnetic coupling.

In this way it is possible to clean all the components in the clean chamber as required. There is just one opening in the sterile chamber 4, which can be statically sealed and therefore does not have to be subjected to any special hygiene treatment.

Figure 4:
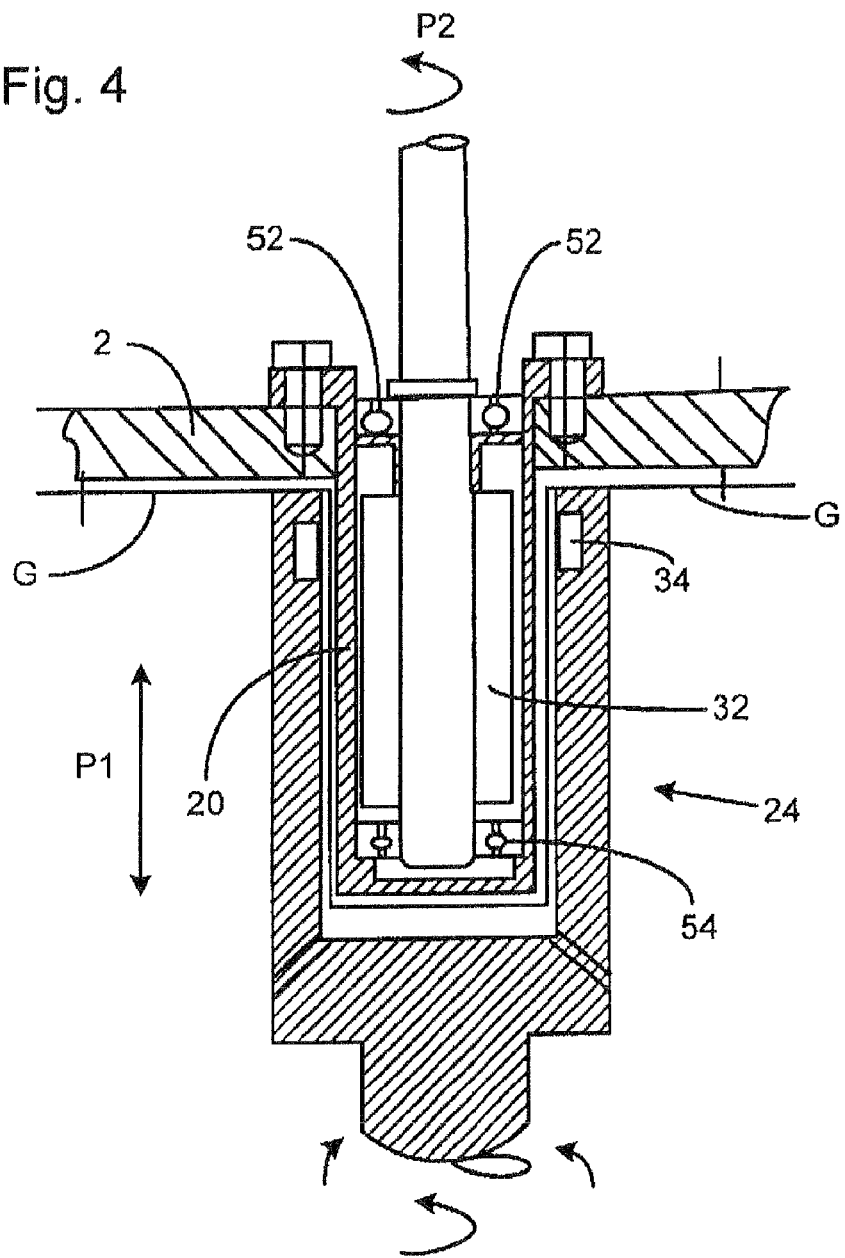
FIG. 4 shows a further detail view of the apparatus of FIG. 1.

FIG. 4 shows a detail view of the two drive elements 22 and 24. It can be seen that the first drive element with the first magnetic elements 32 is mounted by means of bearings 52 and 54 such as to be able to rotate relative to the sleeve-shaped body 20. The sleeve-shaped body 20 itself is inside the sterile chamber 4 and is completely closed and in this form protrudes into the sterile chamber 4. At the same time, the sterile chamber boundary G between the sterile chamber 4 and the surrounding environment U is formed by this sleeve-shaped body 20. As mentioned above, the second sleeve 28 accommodates the sleeve-shaped body 20 completely. This sleeve 28 is mounted in a rotatable manner, as indicated by the arrows P2.

Figure 5:
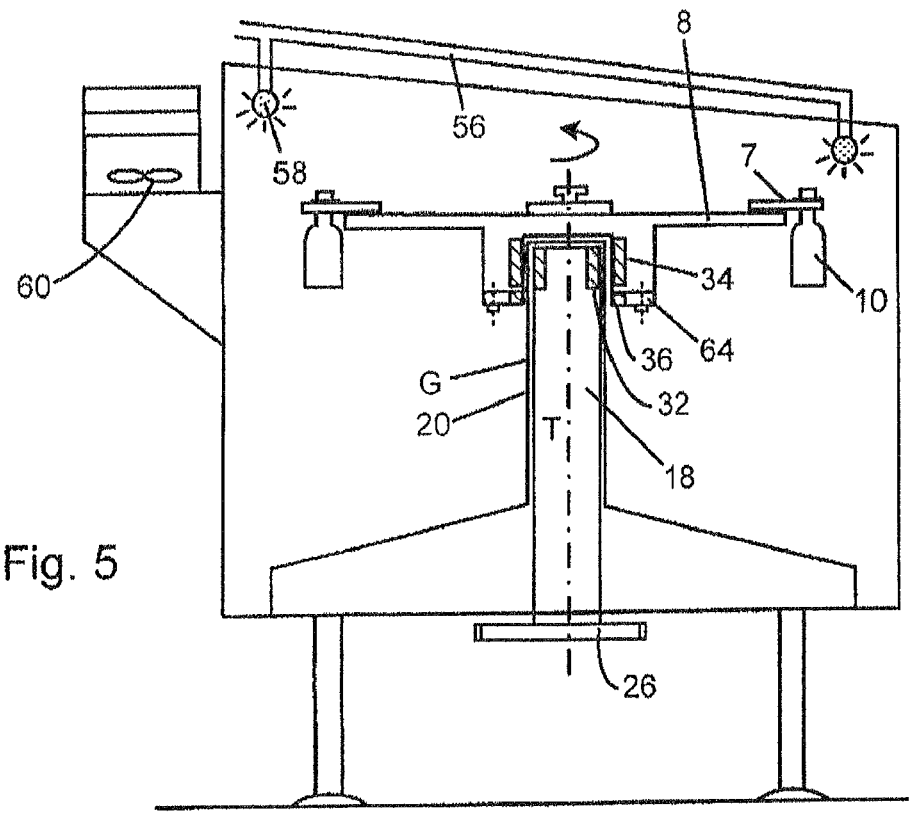
FIG. 5 shows an apparatus according to the invention in a further embodiment.

FIG. 5 concerns a further apparatus according to the invention. In this case, the treatment element 7 is a gripping clamp 7 which carries the container 10. Here too, this gripping clamp is arranged on a carrier 8 and is thus rotatable in its entirety about a carrier axis T. In the embodiment shown in FIG. 5, the rotation of the carrier 8 about the carrier axis T is generated by a magnetic coupling as described in the above-mentioned figures.

Here, therefore, the treatment element 7 is likewise coupled to the second drive element via the carrier 8. The second drive element 24 generates a rotation of the carrier about a carrier axis T and thus also of the treatment element 7 or of a plurality of treatment elements 7 which are arranged on this carrier 8. In this embodiment, the second drive element 24 is preferably arranged such that it cannot move in the direction of the axis of rotation T. The embodiment of the invention shown in FIG. 5 concerns in particular a transport wheel or a transport starwheel.

More specifically, in this case a shaft body 18 is provided, on which in turn the first magnetic elements 32 are arranged. Reference 20 again denotes here a wall between the two drive elements 22 and 24, and more specifically again denotes here a sleeve-shaped body which protrudes into the sterile chamber 4. This sleeve-shaped body 20 is arranged in a stationary manner and the carrier 8 is rotatable as a whole relative to this sleeve-shaped body 20 and also the shaft 18 is rotatable relative to this sleeve-shaped body. The sterile chamber boundary G is again defined by this sleeve-shaped body 20, as in the above embodiments.

Reference 56 denotes a line for foam cleaning and reference 58 denotes corresponding spray heads for cleaning purposes. Via a bearing 36, the carrier is mounted such as to be able to rotate relative to the sleeve-shaped body 20. The bearing can be supported here against the sleeve-shaped body 20. Reference 26 denotes a motor (not shown in any detail here) for generating the rotational movement of the shaft 18 and thus also of the carrier 8. Reference 60 denotes a filter ventilator unit for filtering the air in the sterile chamber 4. Reference 64 denotes an anchoring of the carrier 8 inside the sterile chamber 4. This anchoring serves for stabilising the carrier 8 relative to the bearing 36.

Figure 6:
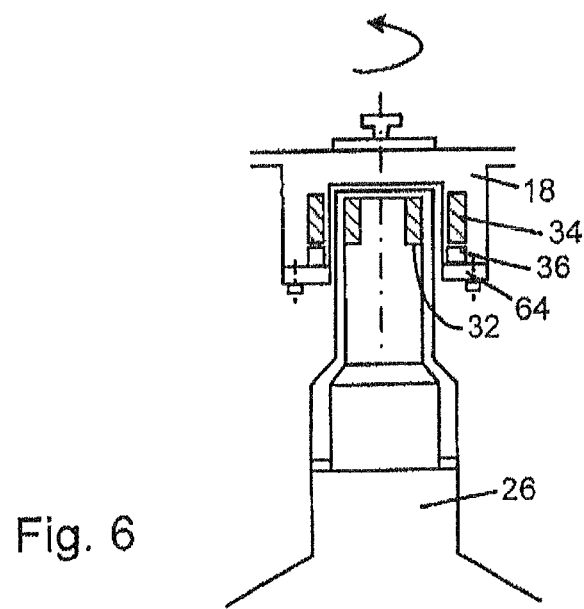
FIG. 6 shows a detail view of the apparatus of FIG. 5.

FIG. 6 shows a more detailed view of the drive unit of FIG. 5. It is also possible to see here once again the magnetic elements 32 and 34, it being pointed out that in this embodiment these magnetic elements and thus also the drive elements 22 and 24 are not movable relative to one another in the direction of the axis of rotation T. Such a displacement is not provided in this embodiment. The principle shown in FIGS. 5 and 6 can be arranged on customary transport devices such as transport starwheels, with the containers in this case always being transported in a clean chamber. It is pointed out that the embodiments shown in FIGS. 5 and 6 on the one hand and 6 to 7 on the other hand can also be combined with one another. It would also be possible to bring about both the rotation of the gripping elements 7 about the central carrier axis T and also the rotation of the closing heads 6 about their own axis in each case by means of magnetic couplings.

Figure 7:
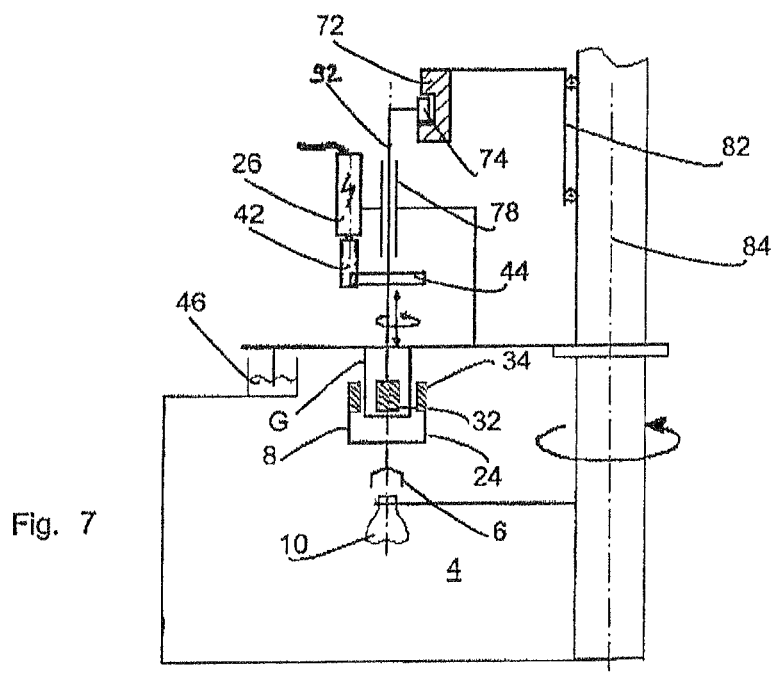
FIG. 7 shows a further embodiment of an apparatus according to the invention.

FIG. 7 shows a further embodiment of the present invention. Here too, the closing head 6 is arranged on a carrier 8. In contrast to the above embodiment, however, here the carrier 8 itself is arranged in a rotatable and also height-displaceable manner in the clean chamber 4.

In this embodiment, the carrier 8 is also the second drive element 24. The magnetisable elements 34 are in this case likewise held on the second drive element 24. In the embodiment shown in FIG. 7, the magnetisable elements 32 do not serve only to transmit a rotational movement but rather also to transmit a lifting movement. The magnetisable elements 32 are in this case arranged on a drive rod 92 (cf. FIG. 8). The drive motor 26 drives a driven toothed wheel 44 via a driving toothed wheel 42, and said driven toothed wheel is in turn connected to the drive rod 92 in a rotationally locked manner.

The drive rod 92 is guided in a guide device 78 and comprises an actuating element 74 which cooperates with a guide cam 72. This guide cam 72 is arranged on the shaft body 84 in a height-displaceable manner via a carriage 82, the shaft body being rotatably mounted in the carriage. Alternatively, the height-displaceability of the guide cam can also be achieved by means of an electric drive, e.g. a linear motor or a servo motor.

Reference 46 denotes a so-called water lock which serves for sealing off the sterile chamber 4 relative to the surrounding environment.

Figure 8:
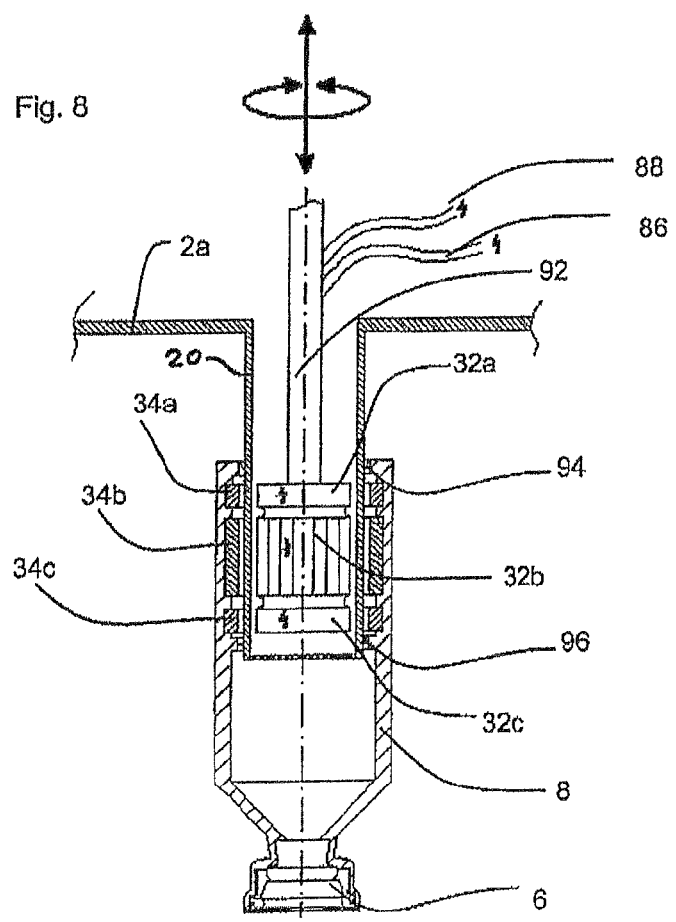
FIG. 8 shows a detail view of the apparatus of FIG. 7.

FIG. 8 shows a detail view of the apparatus shown in FIG. 7. It is possible to see here in particular that the first magnetisable element 32 is composed of three sections 32a-32c which can in each case be magnetised independently of one another, and also the second magnetisable element 34 is composed of three sections 34a-34c which can in each case be magnetised independently of one another.

Specifically, references 32a and 34a in each case denote upper lifting magnets and references 32c and 34c in each case denote lower lifting magnets, wherein references 32a and 32c in each case refer to the inner lifting magnets and references 34a and 34c in each case refer to the outer lifting magnets. The upper and lower lifting magnets cooperate during the lifting movement of the closing head and cause the carrier 8 to follow the movement of the magnetisable element, which is denoted in its entirety by 32.

References 32b and 34b denote the inner and outer rotating magnets, which cooperate in order to generate the rotational movement of the carrier 8 and thus also of the closing head 6. In this embodiment the closing head is held only with magnetic forces.

It is also possible that the magnetic coupling is constructed as an adjustable overload coupling. To avoid mechanical damages, the second drive element 24 can be moved in the longitudinal direction beyond a defined amplitude upwards or decouples. Such events of fault can occur often, if during lowering of the closing head during the closing procedure the closing head and therefore the second drive element 24 are blocked in the movement although the first drive element continues to move downwardly.

In a preferred embodiment the coupling is constructed such that the second drive element 24 after termination of the fault caused from outside moves in its home or coupling position.

If switchable holding magnets are used for the lifting movement, the magnetic force can be switched off for changing the closing head and the second drive element can be drawn downwardly or falls downwardly.

By using sensors or the use of electric magnets the height-deviation of the second drive element with respect to the first drive element can be detected and can also be detected and devaluated during the closing procedure.

By virtue of the suitable setting of the magnetic force (which is preferably electrically adjustable) it is also possible to exert a defined pressure on the closure head during the closing procedure. In this case the first drive element 24 drives further downwardly (against the magnetic force) as admitted by the second drive element. Thereby the two drive elements are displaced with respect to each other and the whole unit works as a magnetic spring.

Here, the magnetisable elements 32a-32c are in each case electromagnets which are separately supplied with current via cable guides 86 and 88. By suitably supplying current to the magnets 32b which are responsible for the rotation, it is also possible to adjust or vary the torque that can be transmitted. By suitably supplying current to the magnets 32a and 32c via the cable guide 88, it is possible to vary the lifting forces that can be transmitted, so that the pressure forces during the closing process of the combination of containers and container closures can accordingly also be specifically set. Furthermore, the coupling force is adjustable in such a way that the first drive element 22 can be further lowered in the event of a closing error, such as e.g. a closure arranged at an angle, but the second drive element 24 can nevertheless remain in the locked height position. This prevents any mechanical damage to the components. In this embodiment, therefore, there is no need for a sprung closing head, i.e. the closing head 6 does not contain any spring elements with a spring action in the direction of the axis of rotation X which are difficult to clean and entail a certain hygiene risk. The respective outer magnets 34a, 34b and 34c are preferably each configured as permanent magnets.

References 94 and 96 denote auxiliary guides for guiding the carrier 8 on the support body 20, which at the same time forms the sterile chamber boundary G here. The auxiliary guides can also serve to prevent the carrier 8 from falling from the support body 20 (for example in the event of power failures). To this end, protrusions (not shown) are arranged at the lower end of the support body. The auxiliary guides and/or protrusions are designed in such a way that the carrier 8 is fixed axially in substantially the lowermost height position by means of fixing elements (not shown) which can easily be released. By releasing the fixing elements or the protrusions (not shown) and by switching on the magnets 32 and/or 34, it is possible to pull the closing heads 6 together with the carriers 8 away from the corresponding support bodies 20 and thus to remove and replace the closing heads 6 together with the carrier 8. However, these auxiliary guides allow both a rotation of the carrier 8 relative to the support body 20 and also a lifting movement of the carrier 8 relative to the support body 20.

The applicant reserves the right to claim all the features disclosed in the application documents as essential to the invention in so far as they are novel individually or in combination with respect to the prior art.

LIST OF REFERENCES 1 apparatus
2 housing
2a housing wall
4 sterile chamber, clean chamber
6 treatment element, closing head
7 treatment element, gripping device
8 carrier
10 container
18 shaft body
20 sleeve-shaped body, wall, support body
22 first drive element
24 second drive element
26 motor
28 sleeve
32 magnetisable elements
32a magnetisable section, inner upper lifting magnet
32b magnetisable section, inner rotating magnet
32c magnetisable section, inner lower lifting magnet
34a magnetisable section, outer upper lifting magnet
34b magnetisable section, outer rotating magnet
34c magnetisable section, outer lower lifting magnet
34 magnetisable elements
36 water lock
38 cam
42 driving toothed wheel
44 driven toothed wheel
46 water lock
52, 54 bearing
56 line for foam cleaning
58 spray head
60 filter ventilator unit
72 guide cam
74 actuating element
76 support body
78 guide device
82 carriage
92 drive rod
X first axis of rotation
Y second axis of rotation
Z third axis of rotation
T carrier axis
G sterile chamber boundary
P1, P2 arrows
U surrounding environment, area outside the sterile chamber

The invention claimed is:

1. An apparatus for treating containers, comprising a housing, inside which a sterile chamber is formed, comprising a treatment element for treating the containers, which treatment element is arranged inside the housing and is rotatable about a predefined axis, wherein the treatment element is arranged on a carrier provided inside the housing, and comprising a drive device for driving the treatment element, wherein this drive device is arranged at least partially outside the sterile chamber, wherein the drive device comprises at least a first drive element arranged outside the sterile chamber for generating rotational movements, and the treatment element is coupled to a second drive element for transmitting torques, said second drive element being arranged inside the sterile chamber and being rotatable about a predefined second axis of rotation, wherein the first drive element and the second drive element cooperate in a contactless manner in order to generate the rotational movement of the treatment element and are separated from one another by at least one wall, and wherein the drive elements in each case have at least one magnetisable element and preferably at least the second drive element is displaceable in the direction of its axis of rotation relative to the sterile chamber, wherein a sterile chamber boundary runs between the first drive element and the second drive element.

2. The apparatus according to claim 1, wherein the first drive element is a coupling device which is rotatable about a third axis of rotation and the second drive element is a second coupling device which cooperates with the first coupling device, and the first coupling device and the second coupling device are configured in such a way that torques can be transmitted in a contactless manner from the first coupling device to the second coupling device.

3. The apparatus according to claim 1, wherein the apparatus is an apparatus for closing containers with closures and the treatment element is a closing head which is rotatable about its own axis.

4. The apparatus according to claim 3, wherein inside the sterile chamber is a lifting cam which brings about a movement of the closing head in a direction of its axis of rotation.

5. The apparatus according to claim 1, wherein the first drive element is displaceable relative to the second drive element in relation to at least one of the axes of rotation.

6. The apparatus according to claim 1, wherein the second drive element comprises a plurality of permanent magnets.

7. The apparatus according to claim 6, wherein the permanent magnets are arranged with alternating polarities in the circumferential direction.

8. The apparatus according to claim 1, wherein the first drive element is arranged inside the second drive element in relation to the second axis of rotation.

9. The apparatus according to claim 1, wherein the magnetic elements of the first drive element are longer than the magnetic elements of the second drive element in the direction of the second axis of rotation.

10. The apparatus according to claim 1, wherein the second drive element is displaceable relative to the first drive element by a predefined distance and magnetisable elements of at least one coupling device ( ) are at least as long as the predefined distance.

11. The apparatus according to claim 1, wherein the carrier is rotatable about a carrier axis and the carrier is coupled to the second drive element.

12. The apparatus according to claim 1, wherein a water lock is provided to seal the sterile chamber.

13. The apparatus according to claim 1, wherein the sterile chamber is delimited with respect to the surrounding environment by a housing.

14. The apparatus according to claim 13, wherein the first drive element is arranged geometrically inside the housing but outside the sterile chamber.

15. The apparatus according to claim 1, wherein the second drive element comprises a rotatable sleeve.

16. The apparatus according to claim 1, wherein a sleeve shaped body is arranged between the first drive element and the second drive element.

17. The apparatus according to claim 16, wherein the sleeve shaped body delimits the sterile chamber.

18. The apparatus according to claim 16, wherein the sleeve shaped body is closed in the direction of the sterile chamber.

* * * * *

UNITED STATES PATENT AND TRADEMARK OFFICE
CERTIFICATE OF CORRECTION

PATENT NO. : 8,375,683 B2
APPLICATION NO. : 12/709139
DATED : February 19, 2013
INVENTOR(S) : Knieling et al.

Page 1 of 1

It is certified that error appears in the above-identified patent and that said Letters Patent is hereby corrected as shown below:

In the Claims

Claim 10, Col. 11, line 22, "device ( ) are" should be --device are--.

Signed and Sealed this
Sixth Day of January, 2015

Michelle K. Lee
*Deputy Director of the United States Patent and Trademark Office*